(12) United States Patent
Trockman et al.

(10) Patent No.: US 12,555,198 B2
(45) Date of Patent: Feb. 17, 2026

(54) MULTIVARIATE INITIALIZATION FOR CONVOLUTIONAL LAYERS

(71) Applicant: Robert Bosch GmbH, Stuttgart (DE)

(72) Inventors: Asher Trockman, Pittsburgh, PA (US); Devin T. Willmott, Pittsburgh, PA (US)

(73) Assignee: Robert Bosch GmbH (DE)

( * ) Notice: Subject to any disclaimer, the term of this patent is extended or adjusted under 35 U.S.C. 154(b) by 259 days.

(21) Appl. No.: 18/373,768

(22) Filed: Sep. 27, 2023

(65) Prior Publication Data

US 2025/0104193 A1  Mar. 27, 2025

(51) Int. Cl.
*G06T 5/60* (2024.01)
*G06T 5/20* (2006.01)

(52) U.S. Cl.
CPC ............... *G06T 5/60* (2024.01); *G06T 5/20* (2013.01); *G06T 2207/20081* (2013.01); *G06T 2207/20084* (2013.01)

(58) Field of Classification Search
CPC ... G06T 5/60; G06T 5/20; G06T 2207/20081; G06T 2207/20084; G06N 3/045; G06V 10/764; G06V 10/774; G06V 10/82
See application file for complete search history.

(56) References Cited

U.S. PATENT DOCUMENTS

| | | | | |
|---|---|---|---|---|
| 12,079,738 B2* | 9/2024 | Parchami | ............ | G06F 18/214 |
| 2020/0074269 A1* | 3/2020 | Trygg | .................... | G06N 7/01 |
| 2020/0394559 A1* | 12/2020 | Zhang | ................... | G06N 20/00 |
| 2022/0129749 A1* | 4/2022 | Moritz | ................ | G06N 3/0464 |
| 2022/0215254 A1* | 7/2022 | Look | ........................ | G06N 3/08 |
| 2022/0366245 A1* | 11/2022 | Guez | ..................... | G06N 3/0464 |
| 2023/0100765 A1* | 3/2023 | Roderick | ............... | G06V 10/82 706/15 |
| 2025/0191337 A1* | 6/2025 | Willmott | ............. | G06V 10/761 |
| 2025/0217493 A1* | 7/2025 | Shi | ........................ | G06F 21/577 |

OTHER PUBLICATIONS

Wang, Yifeng, et al. "PCA based kernel initialization for convolutional neural networks." International Conference on Data Mining and Big Data. Singapore: Springer Singapore, 2020. (Year: 2020).*

(Continued)

*Primary Examiner* — Andrae S Allison
(74) *Attorney, Agent, or Firm* — Dickinson Wright PLLC

(57) ABSTRACT

A method of initializing and training a neural network having a plurality of layers includes defining a first function configured to generate a filter based on a plurality of variance values associated with respective pairs of parameters of the plurality of layers, calculating the plurality of variance values based on depths of respective layers of the plurality of layers such that the variance values increase as the depths increase, calculating a covariance matrix using the first function, the covariance matrix having a block structure and each block of the covariance matrix corresponding to a covariance between a respective parameter and other parameters of the plurality of layers, providing, as input, the covariance matrix to the neural network to initialize the neural network for training, and generating, using the neural network, an output based on the covariance matrix.

20 Claims, 13 Drawing Sheets

(56) References Cited

OTHER PUBLICATIONS

Nariman Zadeh, H. (2020). Learning Embeddings for Graphs and Other High Dimensional Data. (Year: 2020).*

Alex Krizhevsky, Ilya Sutskever, and Geoffrey E Hinton. Imagenet classification with deep convo-lutional neural networks. Communications of the ACM, 60(6):84-90, 2017.

Andrew M Saxe, James L McClelland, and Surya Ganguli. Exact solutions to the nonlinear dynam-ics of learning in deep linear neural networks. arXiv preprint arXiv: 1312.6120, 2013.

Asher Trockman and J Zico Kolter. Patches are all you need arXiv preprint arXiv:2201.09792, 2022.

David W Romero, Robert-Jan Bruintjes, Jakub M Tomczak, Erik J Bekkers, Mark Hoogendoorn, and Jan C van Gemert. Flexconv: Continuous kernel convolutions with differentiable kernel sizes. arXiv preprint arXiv:2110.08059, 2021.

Ekin D Cubuk, Barret Zoph, Jonathon Shlens, and Quoc V Le. Randaugment: Practical automated data augmentation with a reduced search space. In Proceedings of the IEEE/CVF conference on computer vision and pattern recognition workshops, pp. 702-703, 2020.

Geoffrey E. Hinton, Simon Osindero, and Yee Whye Teh. A fast learning algorithm for deep belief nets. Neural Computation, 18:1527-1554, 2006.

George Cazenavette, Joel Julin, and Simon Lucey. Rethinking the role of spatial mixing.

Glorot, Xavier et al. Understanding the difficulty of training deep feedforward neural networks. https://proceedings.mlr.press/v9/glorot10a/glorot10a.pdf.

Guillaume Leclerc, Andrew Ilyas, Logan Engstrom, Sung Min Park, Hadi Salman, and Aleksander Madry. ffcv. https://github.com/libffcv/ffcv/, 2022. commit f253865.

He, Kaiming et al. "Delving Deep into Rectifiers: Surpassing Human-Level Performance on ImageNet Classification." https://arxiv.org/pdf/1502.01852.pdf.

James Martens, Andy Ballard, Guillaume Desjardins, Grzegorz Swirszcz, Valentin Dalibard, Jascha Sohl-Dickstein, and Samuel S Schoenholz. Rapid training of deep neural networks without skip connections or normalization layers using deep kernel shaping. arXiv preprint arXiv:2110.01765, 2021.

Kaiming He, Xiangyu Zhang, Shaoqing Ren, and Jian Sun. Delving deep into rectifiers: Surpassing human-level performance on imagenet classification. In Proceedings of the IEEE international conference on computer vision, pp. 1026-1034, 2015.

Lechao Xiao, Yasaman Bahri, Jascha Sohl-Dickstein, Samuel Schoenholz, and Jeffrey Pennington. Dynamical isometry and a mean field theory of cnns: How to train 10,000-layer vanilla con-volutional neural networks. In International Conference on Machine Learning, pp. 5393-5402. PMLR, 2018.

Qi Han, Zejia Fan, Qi Dai, Lei Sun, Ming-Ming Cheng, Jiaying Liu, and Jingdong Wang. On the connection between local attention and dynamic depth-wise convolution. In International Conference on Learning Representations, 2021.

Ross Wightman, Hugo Touvron, and Herve Jegou. Resnet strikes back: An improved training procedure in timm. arXiv preprint arXiv:2110.00476, 2021.

Shiwei Liu, Tianlong Chen, Xiaohan Chen, Xuxi Chen, Qiao Xiao, Boqian Wu, Mykola Pech-enizkiy, Decebal Mocanu, and Zhangyang Wang. More convnets in the 2020s: Scaling up kernels beyond 51×51 using sparsity. arXiv preprint arXiv:2207.03620, 2022a.

Trockman, Asher, et al. "Understanding the Covariance Structure of Convolutional Filters." 2210.03651, Oct. 2022.

Xavier Glorot and Yoshua Bengio. Understanding the difficulty of training deep feedforward neural networks. In Proceedings of the thirteenth international conference on artificial intelligence and statistics, pp. 249-256. JMLR Workshop and Conference Proceedings, 2010.

Xiaohan Ding, Xiangyu Zhang, Jungong Han, and Guiguang Ding. Scaling up your kernels to 31×31: Revisiting large kernel design in cnns. In Proceedings of the IEEE/CVF Conference on Computer Vision and Pattern Recognition, pp. 11963-11975, 2022.

Yi Zhang, Arturs Backurs, Sebastien Bubeck, Ronen Eldan, Suriya Gunasekar, and Tal Wagner. Unveiling transformers with lego: a synthetic reasoning task. arXiv preprint arXiv:2206.04301, 2022.

Yoshua Bengio and Yann LeCun. Scaling learning algorithms towards AI. In Large Scale Kernel Machines. MIT Press, 2007.

Yukang Chen, Jianhui Liu, Xiaojuan Qi, Xiangyu Zhang, Jian Sun, and Jiaya Jia. Scaling up kernels in 3d cnns. arXiv preprint arXiv:2206.10555, 2022.

Zeyu Wang, Yutong Bai, Yuyin Zhou, and Cihang Xie. Can cnns be more robust than transformers arXiv preprint arXiv:2206.03452, 2022.

Zhuang Liu, Hanzi Mao, Chao-Yuan Wu, Christoph Feichtenhofer, Trevor Darrell, and Saining Xie. A convnet for the 2020s. In Proceedings of the IEEE/CVF Conference on Computer Vision and Pattern Recognition, pp. 11976-11986, 2022b.

* cited by examiner

MULTIVARIATE INITIALIZATION FOR CONVOLUTIONAL LAYERS

TECHNICAL FIELD

The present disclosure relates to initialization strategies for neural networks.

BACKGROUND

Various systems configured to perform tasks using machine learning (ML) or other artificial intelligence (AI) techniques may include one or more neural networks. For example, neural networks may be implemented in systems configured to perform image recognition, object detection, natural language processing, and/or other automated tasks.

SUMMARY

A method of initializing and training a neural network having a plurality of layers includes defining a first function configured to generate a filter based on a plurality of variance values associated with respective pairs of parameters of the plurality of layers, calculating the plurality of variance values based on depths of respective layers of the plurality of layers such that the variance values increase as the depths increase, calculating a covariance matrix using the first function, the covariance matrix having a block structure and each block of the covariance matrix corresponding to a covariance between a respective parameter and other parameters of the plurality of layers, providing, as input, the covariance matrix to the neural network to initialize the neural network for training, and generating, using the neural network, an output based on the covariance matrix.

In other features, the first function corresponds to a Gaussian function. The filter is a super-Gaussian filter. The covariance corresponds to a covariance between a filter pixel and other filter pixels. Calculating the plurality of variance values includes calculating the plurality of variance values further based on a velocity that indicates a rate at which the variance values increase from an initial variance as the depths increase. Calculating the plurality of variance values includes calculating the plurality of variance values further based on an acceleration parameter. Calculating the plurality of variance values includes calculating the plurality of variances in accordance with $$\sigma \leftarrow \sigma_0 + v_\sigma d + \frac{1}{2} a_\sigma d^2,$$

where $\sigma$ is a calculated variance value, $\sigma_0$ is an initial variance, $v$ is a velocity at which variance grows from the initial variance as a depth d increases, and $\alpha$ is an acceleration parameter. The covariance matrix is used to define a multivariate probability distribution, and initializing the neural network includes sampling the multivariate probability distribution to obtain initial filters for the neural network.

A computing device configured to initialize and train a neural network having a plurality of layers includes a processing device configured to execute instructions stored in memory to define a first function configured to generate a filter based on a plurality of variance values associated with respective pairs of parameters of the plurality of layers, calculate the plurality of variance values based on depths of respective layers of the plurality of layers such that the variance values increase as the depths increase, calculate a covariance matrix using the first function, the covariance matrix having a block structure and each block of the covariance matrix corresponding to a covariance between a respective parameter and other parameters of the plurality of layers, provide, as input, the covariance matrix to the neural network to initialize the neural network for training, and generate, using the neural network, an output based on the covariance matrix.

In other features, the first function corresponds to a Gaussian function. The filter is a super-Gaussian filter. The covariance corresponds to a covariance between a filter pixel and other filter pixels. To calculate the plurality of variance values, the processing device is configured to execute instructions to calculate the plurality of variance values further based on a velocity that indicates a rate at which the variance values increase from an initial variance as the depths increase. To calculate the plurality of variance values, the processing device is configured to execute instructions to calculate the plurality of variance values further based on an acceleration parameter. To calculate the plurality of variance values, the processing device is configured to execute instructions to calculate the plurality of variances in accordance with $$\sigma \leftarrow \sigma_0 + v_\sigma d + \frac{1}{2} a_\sigma d^2,$$

where $\sigma$ is a calculated variance value, $\sigma_0$ is an initial variance, $v$ is a velocity at which variance grows from the initial variance as a depth d increases, and a is an acceleration parameter. The processing device is configured to execute instructions to use the covariance matrix to define a multivariate probability distribution, and initializing the neural network includes sampling the multivariate probability distribution to obtain initial filters for the neural network. A computer-controlled machine includes the computing device and further includes an actuator configured to control an operation of the computer-controlled machine based on an output of the neural network.

A system configured to train a neural network having a plurality of layers includes data storage that stores training data for training the neural network, memory that stores a data representation of the neural network, and a processing device configured to iteratively train the neural network using the training data to obtain a trained neural network. Iteratively training the neural network includes initializing the neural network by defining a first function configured to generate a filter based on a plurality of variance values associated with respective pairs of parameters of the plurality of layers, calculating the plurality of variance values based on depths of respective layers of the plurality of layers such that the variance values increase as the depths increase, calculating a covariance matrix using the first function, the covariance matrix having a block structure and each block of the covariance matrix corresponding to a covariance between a respective parameter and other parameters of the plurality of layers, and providing, as input, the covariance matrix to the neural network to initialize the neural network for training by the processing device.

In other features, calculating the plurality of variance values includes calculating the plurality of variance values further based on a velocity that indicates a rate at which the variance values increase from an initial variance as the depths increase. Calculating the plurality of variance values includes calculating the plurality of variances in accordance with $$\sigma \leftarrow \sigma_0 + v_\sigma d + \frac{1}{2} a_\sigma d^2,$$

where $\sigma$ is a calculated variance value, $\sigma_0$ is an initial variance, $v$ is a velocity at which variance grows from the initial variance as a depth d increases, and a is an acceleration parameter.

DETAILED DESCRIPTION

Figure 1:
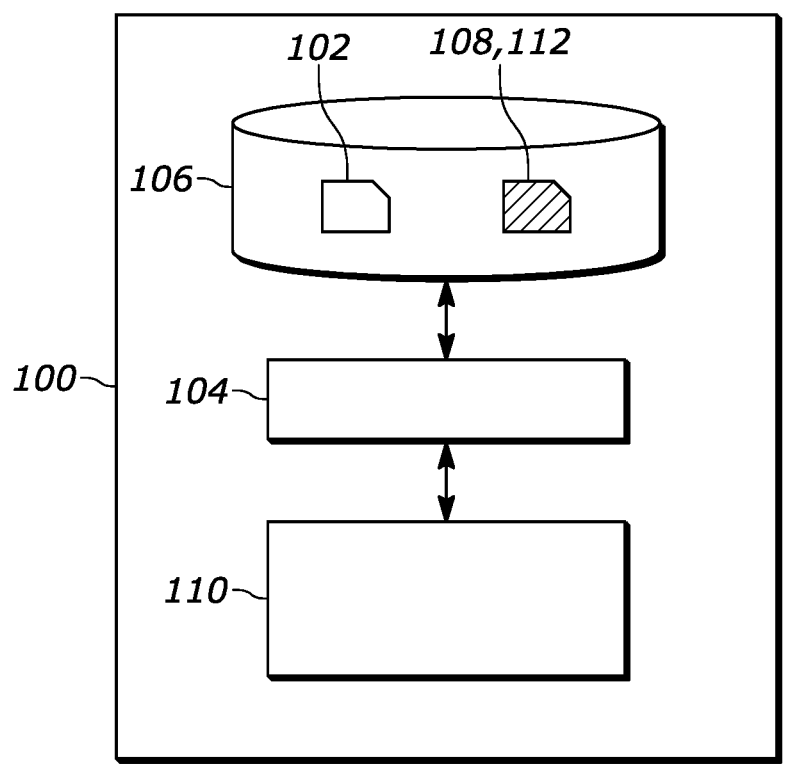
FIG. 1 generally illustrates a system for training a neural network according to the principles of the present disclosure.

Embodiments of the present disclosure are described herein. It is to be understood, however, that the disclosed embodiments are merely examples and other embodiments can take various and alternative forms. The figures are not necessarily to scale: some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Neural networks (e.g., neural networks for ML and other AI systems) are typically trained using gradient descent or other training techniques. Gradient descent training includes passing training examples through the neural network, measuring performance of the neural network with a loss function that compares the predictions of the neural network with the correct prediction, calculating the gradient of a loss function with respect to parameters of the neural network, and updating model parameters by subtracting the gradient of the model parameters, with the ultimate goal of decreasing the value of the loss function in future iterations.

The process of choosing starting values for parameters of the neural network is referred to as initialization. Initialization of a neural network includes setting initial values of various parameters, such as weights, biases, etc. For example, in conventional initialization techniques, neural network weights may be initialized at random from univariate distributions, by selecting parameters by sampling from a probability distribution, etc. These and other initialization techniques (e.g., Kaiming initialization, Xavier initialization, etc.) may include controlling only the variance of individual weights, even in highly-structured operations such as convolutions. In other words, each parameter of the neural network is initialized independently and there is no relationship or dependence between initial values of any pair of parameters (e.g., the covariance of any pair of parameters is 0).

Neural network initialization systems and methods of the present disclosure are configured to initialize parameters in convolutional layers (e.g., convolutional filters) of neural networks in accordance with a multivariate distribution having a nonzero covariance. In this manner, structural relationships between pairs of parameters of the neural network are enforced. By specifying the covariance of convolutional filters at initialization rather than just the variance, faster convergence and higher accuracy are attained. Accordingly, a neural network initialized in accordance with the principles of the present disclosure trains more quickly (i.e., performance of the neural network improves more quickly during training) and achieves higher performance at the conclusion of training.

In some examples, the convolutional layers can be initialized according to the principles of the present disclosure and then frozen (i.e., fixed such that the parameters of the convolutional layers remain unchanged during training of the neural network). In these examples, training iterations take less time because the neural network has fewer parameters that need to be updated in each training iteration. In some examples, initializing and then freezing network parameters in this manner may result in the same or similar performance as initializing with previous initialization techniques (i.e., where initialized parameters are not frozen).

FIG. 1 shows one example system 100 for training a neural network (e.g., of an ML model). The system 100 may be configured to (and/or include circuitry configured to) implement the systems and methods of the present disclosure described below in more detail. The system 100 may comprise an input interface for accessing training data 102 for the neural network. For example, as illustrated in FIG. 1, the input interface may be constituted by a data storage interface 104 which may access the training data 102 from data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also external data storage, e.g., network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The processor subsystem 110 is configured to train the neural network in accordance with neural network initialization systems and methods of the present disclosure as described below in more detail.

The system 100 may further comprise an output interface for outputting a data representation 112 of the trained neural network. This data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may, during or after the training, be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
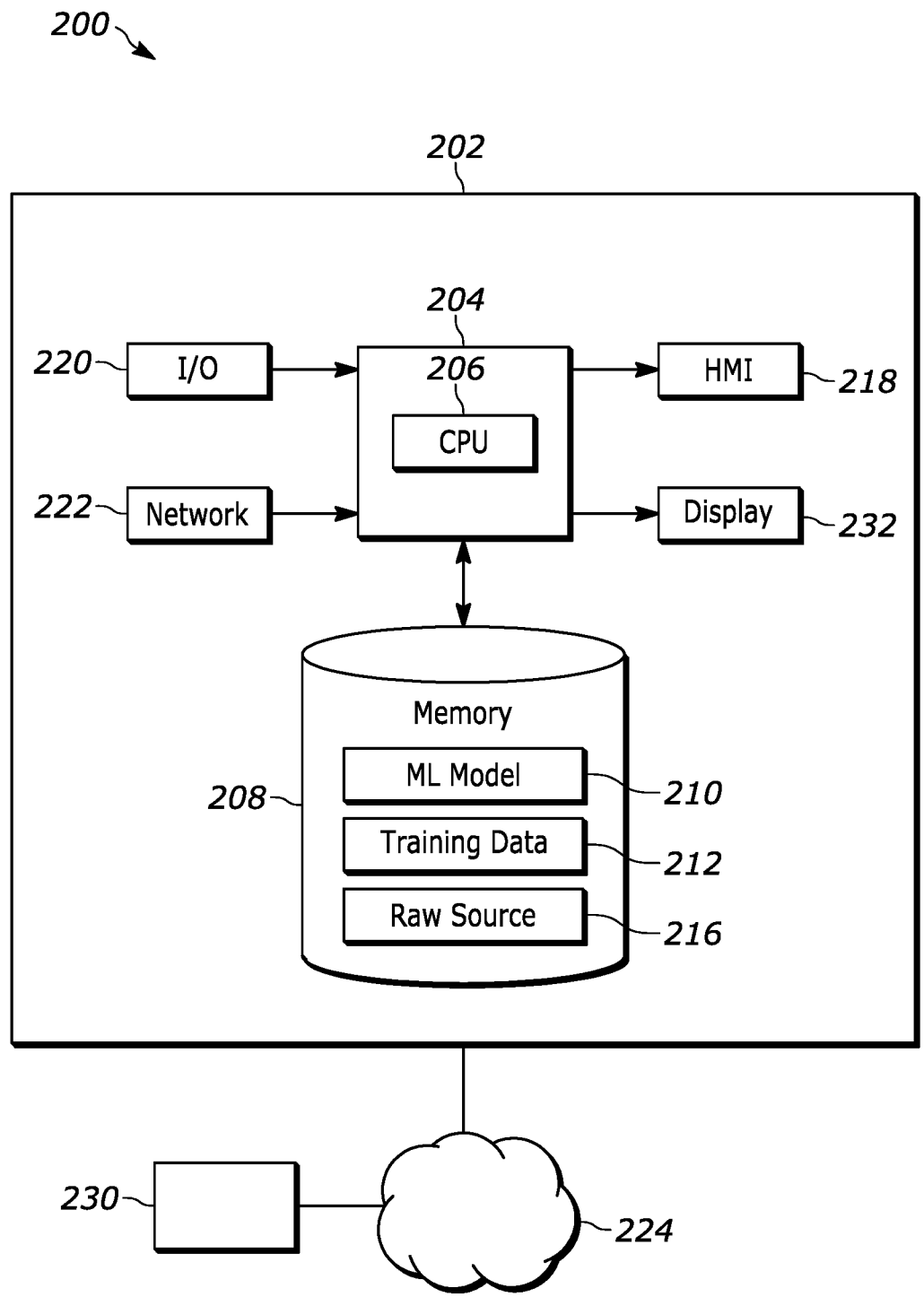
FIG. 2 generally illustrates a computer-implemented method for training and utilizing a neural network according to the principles of the present disclosure.

FIG. 2 depicts a data annotation/augmentation system 200 configured to (and/or including circuitry configured to) implement a system for annotating and/or augmenting data. The data annotation system 200 may include at least one computing system 202 configured to implement all or portions of the systems and methods of the present disclosure explained below in more detail. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. Various components of the system 200 may be implemented with same or different circuitry.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216, etc.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 that is configured to analyze the raw source dataset 216. For example, the CPU 206 and/or other circuitry may implement the machine-learning model 210. The raw source dataset 216 may include raw or unprocessed sensor data that may be representative of an input dataset for a machine-learning system. The raw source dataset 216 may include video, video segments, images, audio, text-based information, and raw or partially processed sensor data (e.g., radar map of objects). In some embodiments, the machine-learning model 210 may be a deep-learning or neural network algorithm that is designed to perform a predetermined function. For example, the neural network algorithm may be configured to identify events or objects in video segments based on audio data.

The computer system 200 may store the training dataset 212 for the machine-learning model 210. The training dataset 212 may represent a set of previously constructed data for training the machine-learning model 210. The training dataset 212 may be used by the machine-learning model 210 to learn weighting factors associated with a neural network algorithm. The training dataset 212 may include a set of source data that has corresponding outcomes or results that the machine-learning model 210 tries to duplicate via the learning process.

The machine-learning model 210 may be operated in a learning mode using the training dataset 212 as input. The machine-learning model 210 may be executed over a number of iterations using the data from the training dataset 212. With each iteration, the machine-learning model 210 may update internal weighting factors based on the achieved results. For example, the machine-learning model 210 can compare output results (e.g., annotations) with those included in the training dataset 212. Since the training dataset 212 includes the expected results, the machine-learning model 210 can determine when performance is acceptable. After the machine-learning model 210 achieves a predetermined performance level (e.g., 100% agreement with the outcomes associated with the training dataset 212), the machine-learning model 210 may be executed using data that is not in the training dataset 212. The trained machine-learning model 210 may be applied to new datasets to generate annotated data. The machine-learning model 210 may include a neural network trained in accordance with neural network initialization systems and methods of the present disclosure.

The machine-learning model 210 may be configured to identify a particular feature in the raw source data 216. The raw source data 216 may include a plurality of instances or input dataset for which annotation results are desired (e.g., a video stream or segment including audio data). For example only, the machine-learning model 210 may be configured to identify objects or events in a video segment based on audio data and annotate the events. The machine-learning model 210 may be programmed to process the raw source data 216 to identify the presence of the particular features. The machine-learning model 210 may be configured to identify a feature in the raw source data 216 as a predetermined feature. The raw source data 216 may be derived from a variety of sources. For example, the raw source data 216 may be actual input data collected by a machine-learning system. The raw source data 216 may be machine generated for testing the system. As an example, the raw source data 216 may include raw video and/or audio data from a camera, audio data from a microphone, etc.

In an example, the machine-learning model 210 may process raw source data 216 and output video and/or audio data including one or more indications of an identified event. The machine-learning model 210 may generate a confidence level or factor for each output generated. For example, a confidence value that exceeds a predetermined high-confidence threshold may indicate that the machine-learning model 210 is confident that the identified event (or feature) corresponds to the particular event. A confidence value that is less than a low-confidence threshold may indicate that the machine-learning model 210 has some uncertainty that the particular feature is present.

Figure 3A:
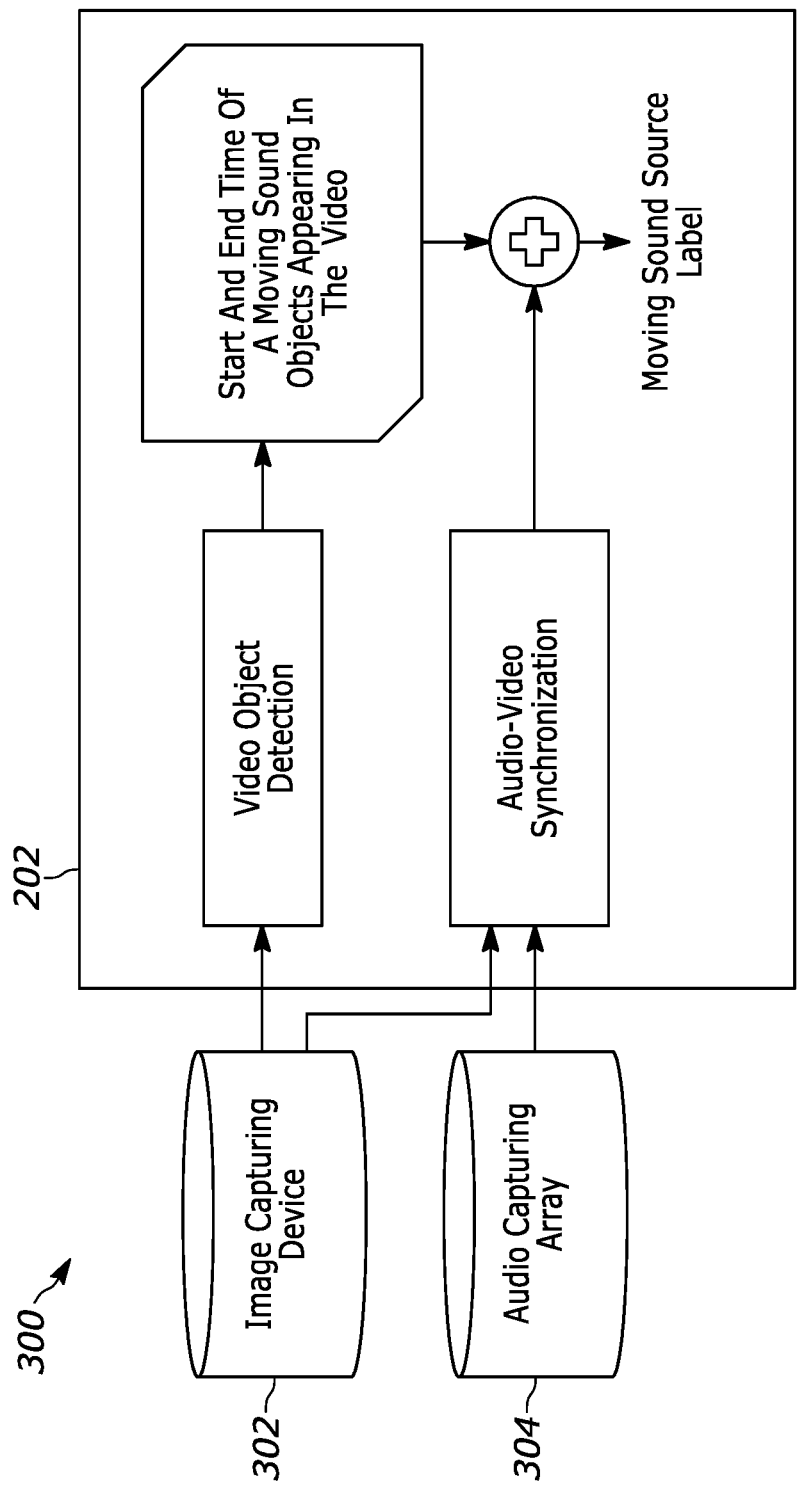
FIG. 3A generally illustrates an audio data labeling system according to the principles of the present disclosure.
Figure 3B:
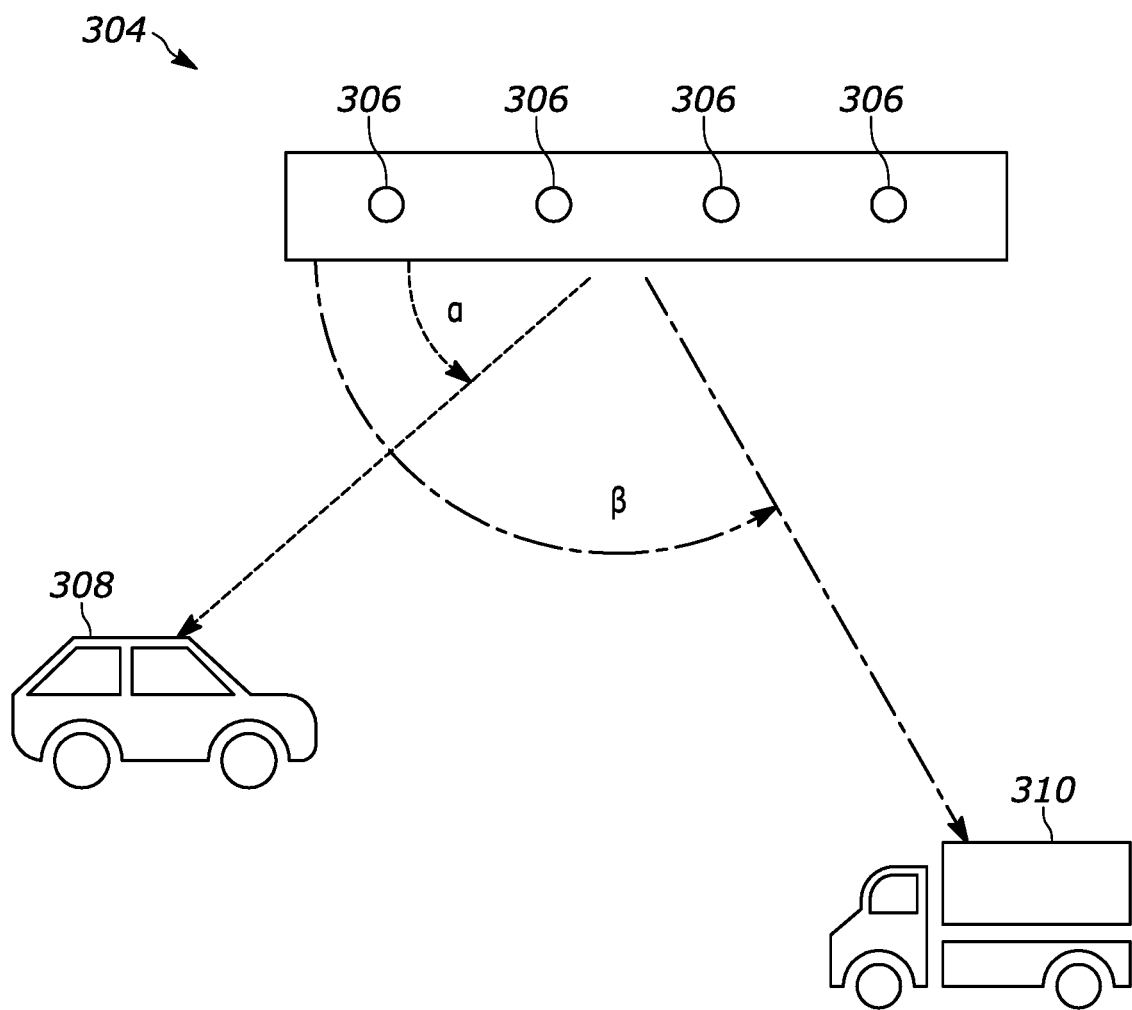
FIG. 3B generally illustrates a portion of a data capturing system according to the principles of the present disclosure.

As is generally illustrated in FIGS. 3A and 3B, a system 300 may include an image (e.g., video) capturing device 302, an audio capturing array 304, and the computing system 202. The system may receive, from the image capturing device 302, video stream data associated with a data capture environment. The system 202 may be configured to perform video object detection to identify one or more objects in corresponding images of the video stream data. The system 202 may receive, from the audio capturing array 304, audio stream data that corresponds to at least a portion of the video stream data. The audio capturing array 304 may include one or more microphones 306 or other suitable audio capturing devices. The systems and methods described herein may be configured to label, using output from at least a first machine-learning model (e.g., such as the machine-learning model 210 or other suitable machine-learning model configured to provide output including one or more object or event detection predictions), at least some objects of the video stream data and/or audio stream data.

The system 202 may calculate (e.g., using at least one probabilistic-based function or other suitable technique or function), based on at least one data capturing characteristic, at least one offset value for at least a portion of the audio stream data that corresponds to at least one labeled object of the video stream data. The system 202 may synchronize, using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The system 202 may label, using one or more labels of the labeled objects of the video stream data and the at least one offset value, at least the portion of the audio stream data that corresponds to the at least one labeled object of the video stream data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Figure 3C:
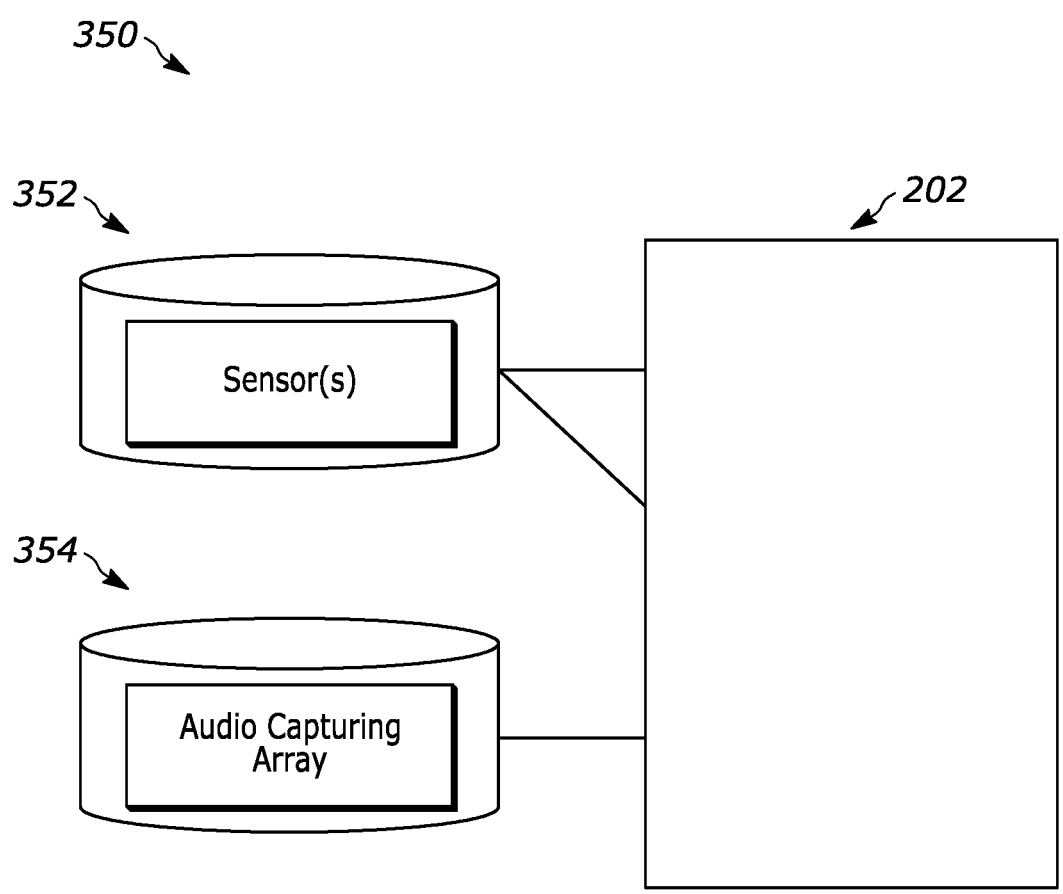
FIG. 3C generally illustrates an alternative audio data labeling system, according to the principles of the present disclosure.

In some embodiments, as is generally illustrated in FIG. 3C, the computing system 202 may be configured to label audio data based on sensor data received from one or more sensors, such as those described herein or any other suitable sensor or combination of sensors. The system 202 may receive, from the audio capturing array 354 or any suitable audio capturing device, such as one or more of the microphones 306 or other suitable audio capturing device, audio stream data associated with a data capture environment. It should be understood that the audio capturing array 354 may include features similar to those of the audio capturing array 304 and may include any suitable number of audio capturing devices. The system 202 may receive, from at least one sensor (e.g., such as the sensor 352) that is asynchronous relative to the audio capturing array 354, sensor data associated with the data capture environment. The sensor 354 may include at least one of an induction coil, a radar sensor, a LiDAR sensor, a sonar sensor, an image capturing device, any other suitable sensor, or a combination thereof. The audio capturing array 354 may be remotely located from the sensor 354, proximately located to the sensor 354, or located in any suitable relationship to the sensor 354.

The system 202 may identify, using output from at least a first machine learning model, such as the machine learning model 210 or other suitable machine learning model, at least some events in the sensor data. The machine learning model 210 may be configured to provide output including one or more event detection predictions based on the sensor data. The system 202 may synchronize at least a portion of the sensor data associated with the portion of the audio stream data that corresponds to the at least one event of the sensor data. The system 202 may label, using one or more labels extracted for respective events of the sensor data value, at least the portion of the audio stream data that corresponds to the at least one event of the sensor data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Any of the systems described herein may implement the neural network initialization systems and methods of the present disclosure as described below in more detail.

Convolutional layers in neural networks are composed of a number of filters. A filter is a k×k matrix, where k (in some examples, an odd value) corresponds to a kernel size. A multivariate normal distribution or multivariate Gaussian distribution is denoted $\mathcal{N}(\mu, \Sigma)$, where $\mu \in \mathcal{R}^K$ is the mean vector and $\Sigma \in \mathcal{R}^{k \times k}$ is the covariance matrix (with a block structure) of the distribution, E has k×k blocks, and each block $[\Sigma_{i,j}] \in \mathcal{R}^{k \times k}$ corresponds to the covariance between filter pixel i, j and all other $k^2-1$ filter pixels. In other words, $[\Sigma_{i,j}]_{l,m} = [\Sigma_{l,m}]$, gives the covariance of pixels i, j and l, m. A property of multivariate Gaussian distributions is that the distribution can be sampled by taking a vector z of size k with elements sampled from the univariate Gaussian distribution $\mathcal{N}(0, 1)$ to perform the operation $\Sigma z + \mu$.

Filter covariance matrices in various types of pre-trained neural networks have a great deal of structure, which can be observed across models with different patch sizes, architectures, and data sets (e.g., repetitive structure can be observed in both block and rearranged forms of covariance matrices). For example, filters in earlier layers tend to be more focused, while filters in become more diffuse as depth increases. In other words, the overall variance of filters tends to increase with depth, until breaking down towards the last layer. The sub-blocks of the covariances often have a static negative component in the center, with a dynamic positive component whose position mirrors that of the block itself. The covariance of filter parameters tends to be greater in a center region (i.e., covariance matrices are at first centrally-focused and become more diffuse with depth). Accordingly, most filters have the greatest weight towards their respective centers, and the parameters of the filters are correlated with neighboring parameters.

In an example, covariance matrices according to the principles of the present disclosure can be constructed by fixing the (odd) filter size $k \in \mathbb{N}^+$ and defining $1 \in \mathbb{R}^{k \times k}$ as an all-ones matrix. As a foundation for initialization, unnormalized Gaussian-like filters $Z_\sigma \in \mathbb{R}^{k \times k}$ with a single variance parameter $\sigma$ are used, defined elementwise by:

$$(Z_\sigma)_{i,j} := \exp\left(-\frac{\left(i - \lfloor \frac{k}{2} \rfloor\right)^2 + \left(j - \lfloor \frac{k}{2} \rfloor\right)^2}{2\sigma}\right) \text{ for } 1 \leq i, j, \leq k.$$

To capture the dynamic component that moves according to the position of a respective block, the block matrix $C \in \mathbb{R}^{k^2 \times k^2}$ with k×k blocks is defined by:

$$[C_{i,j}] = \text{Shift}\left(Z_\sigma, i - \left\lfloor \frac{k}{2} \right\rfloor, j - \left\lfloor \frac{k}{2} \right\rfloor\right),$$

where the Shift operation translates each element of the matrix i and/positions forward in their respective dimensions, wrapping around when elements overflow. A static component S and a blockwise mask component M constructed from Gaussian filters can then be defined as:

$$S = 1 \otimes Z_\sigma \in \mathbb{R}^{k^2 \times k^2}; \text{ and}$$

$$M = Z_\sigma \otimes 1 \in \mathbb{R}^{k^2 \times k^2}$$

which encodes higher variance as pixels approach the center of the filter.

Using the static and mask components, an example covariance matrix can be defined as:

$$\hat{\Sigma} = M \odot \left(C - \frac{1}{2}S\right),$$

where $\odot$ is an elementwise product. While this example generally represents structural components of filter covariance matrices, the property $[\Sigma_{i,j}]_{l,m} = [\Sigma_{l,m}]_{i,j}$ described above is not satisfied (i.e., covariance matrices must be symmetric to account for the block representation of the present disclosure). Accordingly, the symmetric portion can be calculated as a "block-transpose" as shown below:

$$\Sigma^B = \Sigma' \Leftrightarrow [\Sigma_{i,j}]_{\ell,m} = [\Sigma'_m]_{i,j} \text{ for } 1 \leq i, j, \ell, m \leq k,$$

which corresponds to a shuffle permutation where:

$$(X \otimes Y)^B = Y \otimes X,$$

with X, Y $\in \mathbb{R}^{k \times k}$.

Due to the shift operation defined above, $C^B = C$. Since $S^B = M$ and $M^B = S$, $\Sigma$ can be defined as the symmetric part of $\hat{\Sigma}$ (where C, S, M are implicitly parameterized by $\sigma$, similarly to $Z_\sigma$):

$$\Sigma = \frac{1}{2}\left(\hat{\Sigma} + \hat{\Sigma}^B\right) = \frac{1}{2}\left[M \odot \left(C - \frac{1}{2}S\right) + \left(M \odot \left(C - \frac{1}{2}S\right)\right)^B\right] =$$

$$\frac{1}{2}\left[M \odot \left(C - \frac{1}{2}S\right) + \left(M^B \odot \left(C^B - \frac{1}{2}S^B\right)\right)\right] = M \odot \left(C - \frac{1}{2}S\right) +$$

$$S \odot \left(C - \frac{1}{2}M\right) = \frac{1}{2}\left[M \odot \left(C - \frac{1}{2}S\right) + \left(M^B \odot \left(C^B - \frac{1}{2}S^B\right)\right)\right] =$$

$$M \odot \left(C - \frac{1}{2}S\right) + S \odot \left(C - \frac{1}{2}M\right) = \frac{1}{2}[M \odot (C-S) + S \odot C].$$

Figure 4A:
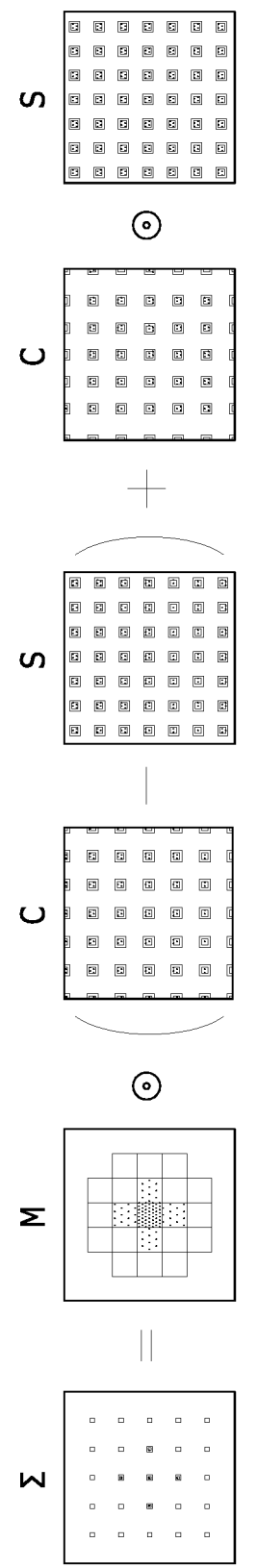
FIG. 4A generally illustrates construction of a covariance matrix according to the principles of the present disclosure.

While $\Sigma$ is now symmetric, $\Sigma$ is not positive semi-definite, but can be projected to $S_+^{k^2}$, which may be performed automatically by multivariate Gaussian procedures. FIG. 4A illustrates construction of the covariance matrix $\Sigma$ as described above according to the principles of the present disclosure, where $\Sigma$ is defined as $\Sigma = M \odot (C-S) + C \odot S$.

To complete the initialization of the neural network, since filters become more diffuse as depth increases, the parameter $\sigma$ is increased as depth increases according to a simple quadratic schedule. For example, for a percentage depth d, where $$d = \frac{i-1}{D-1}$$

for the $i^{th}$ convolutional layer of a model with D total layers (e.g., in input layer, intermediate layers, and an output layer, where each layer is a filter comprised of a k×k matrix), the covariance construction can be parameterized for a layer i in accordance with a variance schedule defined as:

$$\sigma(d) = \sigma_0 + v_\sigma d + \frac{1}{2}a_\sigma d^2,$$

Where $\sigma 0$, $v_\sigma$, and $\alpha_\sigma$ jointly describe how covariance evolves as depth increases. Then, for each layer $i \in 1, \ldots, D$, $$d = \frac{i-1}{D-1}$$

is calculated and the filters F are calculated according to:

$$F_{i,j} \sim \mathcal{N}\left(0, \Sigma'_{\sigma(d)}\right) \text{ for } j \in 1, \ldots, H.$$

Figure 4B:
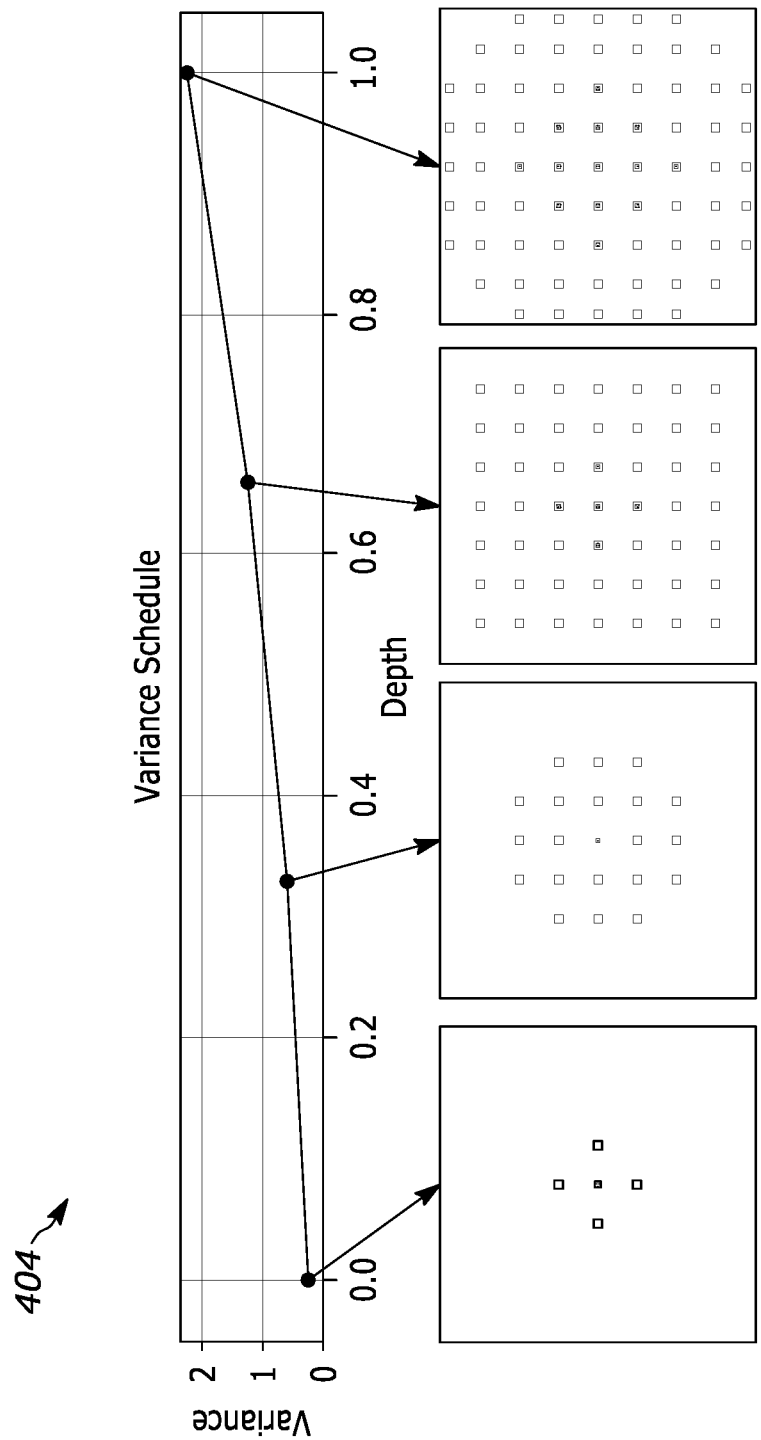
FIG. 4B generally illustrates an example of variance changing with depth according to the principles of the present disclosure.

FIG. 4B illustrates an example of variance changing with depth. Variance increases quadratically with depth according to a schedule (e.g., as shown in variance schedule 400) which can be chosen through visual inspection of pre-trained models or through grid search. In this example, the parameters $\sigma 0 = 0.5$, $v_\sigma = 0.5$, and $a_\sigma = 3$ are used.

In an example, neural network initialization systems and methods according to the present disclosure are configured to implement first and second algorithms to generate initial parameters for a neural network. For example, the first algorithm or method (e.g., a "Gaussian ( )" function as defined below in more detail) is used to construct a super-Gaussian filter according to several hyperparameters. The second algorithm or method (e.g., a function "ConvolutionalInitialization ( )") uses the Gaussian ( ) function to construct a covariance matrix $\Sigma$ of size $k^2 \times k^2$ and then samples from the multivariate Gaussian distribution with zero mean and a covariance matrix equal to E in order to generate initial parameters for a convolutional layer of a neural network.

In an example, the Gaussian ( ) function is defined as Gaussian (k, $\mu_x$, $\mu_y$, $\sigma$, p), with the inputs corresponding to kernel size k, Centers $\mu_x$, $\mu_y$, Variance $\sigma$, and Power p.

A Gaussian filter A can be constructed in accordance with the following steps (which may be referred to as Algorithm 1):

---

1) A ← k × k matrix of 0s (e.g., initialize the filter as a matrix of 0s)
2) For i in 0, 1, ... , k − 1:

-continued a. For j in 0, 1, ... , k − 1:
   i. $C_x \leftarrow (j - \mu_x - \lfloor k/2 \rfloor - 1) \bmod k$
   ii. $C_y \leftarrow (i - \mu_y - \lfloor k/2 \rfloor - 1) \bmod k$
   iii. $x \leftarrow (C_x - \lfloor k/2 \rfloor)/\lfloor k/2 \rfloor$
   iv. $y \leftarrow (C_y - \lfloor k/2 \rfloor)/\lfloor k/2 \rfloor$ v. $v \leftarrow \dfrac{(x^2 + y^2)}{\sigma}$ vi. $A_{i,j} \leftarrow \exp\left(-\dfrac{1}{2}v^p\right)$ 3) Return A The ConvolutionalInitialization ( ) function is defined as ConvolutionalInitialization (k, d, $\sigma_0$, $v_\sigma$, $a_\sigma$, p, n), with the inputs corresponding to kernel size k, Depth d, Initial variance $\sigma_0$, Velocity parameter $v_\sigma$, Acceleration parameter $\alpha_\sigma$, Power p, and a Number n of filters to generate.

A covariance matrix $\Sigma$ can be constructed in accordance with the following steps (which may be referred to as Algorithm 2), where $\otimes$ refers to the Kronecker product of two matrices and $\odot$ refers to elementwise multiplication of two matrices:

1) $\Sigma_c \leftarrow k^2 \times k^2$ matrix of 0s (e.g., initialize the covariance matrix as a matrix of 0s)

$$\sigma \leftarrow \sigma_0 + v_\sigma d + \frac{1}{2}a_\sigma d^2 \quad \text{2)}$$

(calculate variance from the depth, where variance grows from an initial variance as depth d (e.g., a depth percentage) increases in accordance with a velocity v)

3) For i in 0,1, ... , k − 1:
   a. For j in 0, 1, ... , k − 1:
      i. Set i, j block of $\Sigma_c$ to be Gaussian(k, j, i, σ, p)
4) L ← k × k matrix of 1s
5) Z ← Gaussian(k, 0, 0, σ, p)
6) S ← L ⊗ Z, M ← Z ⊗ L 7) $\sum \leftarrow M \odot \left(\sum_c - \dfrac{1}{2}S\right)$ 8) F ← n × $k^2$ matrix of 0s – this will be the set of filters output
9) For i in 0, 1, ... , n − 1:
   a. Set i-th row of F to be a sample from $\mathcal{N}(0, \Sigma)$
10) Return F The set of filters F of the covariance matrix E is used to generate initial parameters for a convolutional layer of a neural network.

Figure 4C:
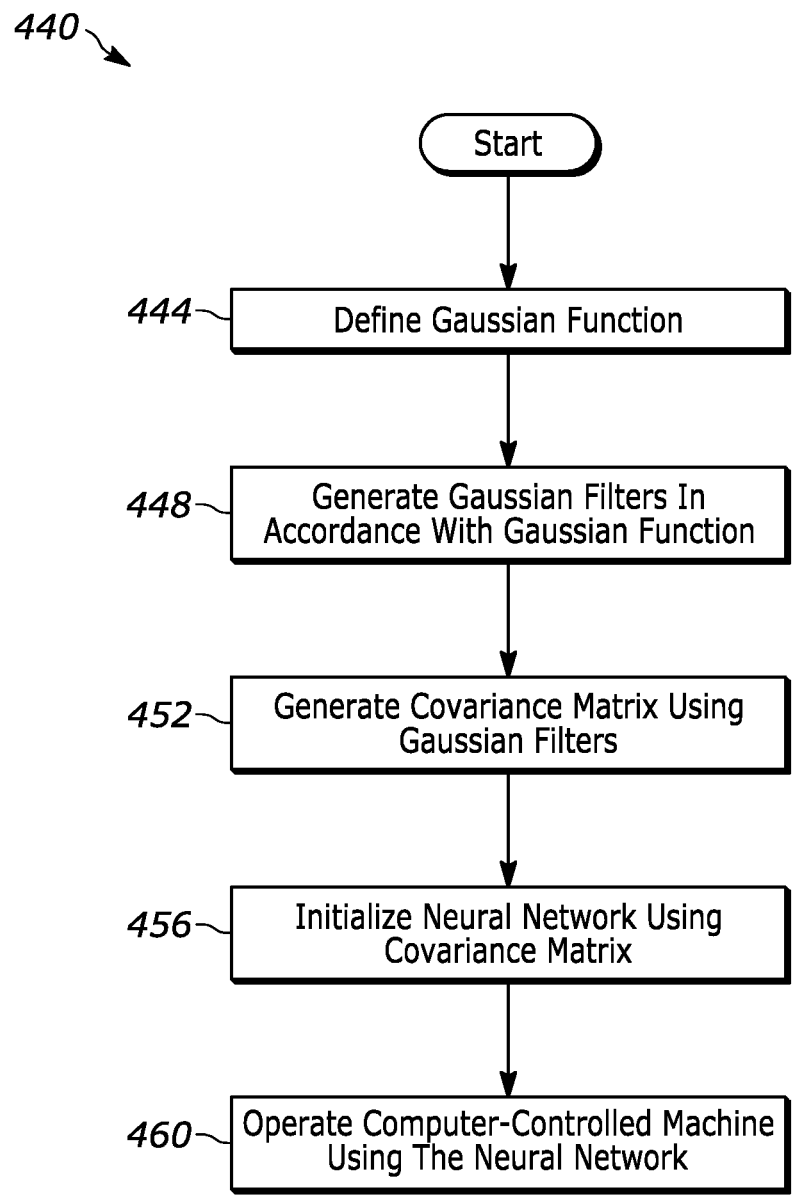
FIG. 4C illustrates steps of an example neural network initialization method according to the principles of the present disclosure.

FIG. 4C illustrates steps of an example neural network initialization method 440 according to the principles of the present disclosure. For example, one or more processors or processing devices are configured to execute instructions to implement the method 440, such as one or more of the processors of the systems described herein.

At 444, a function (e.g., a Gaussian ( ) function as described above) is defined as Gaussian (k, $\mu_x$, $\mu_y$, σ, p), with the inputs corresponding to kernel size k, Centers $\mu_x$, $\mu_y$, Variance σ, and Power p. At 448, one or more Gaussian filters A are constructed in accordance with the function Gaussian (k, $\mu_x$, $\mu_y$, σ, p). At 452, a covariance matrix is generated using a set F of the Gaussian filters A. For a neural network having a plurality of layers, a covariance matrix is generated for each of the plurality of layers and each covariance matrix is used to generate layer weights for a respective one of the plurality of layers.

Although as described herein the covariance matrix is generated using Gaussian filters, the covariance matrix according to the present disclosure can be generated using other techniques.

At 456, a neural network is initialized using the covariance matrix 2 and trained accordingly. In other words, since the covariance matrix E is populated with nonzero covariance values, the neural network is initialized using inputs that correspond to structural relationships between pairs of parameters of the neural network (e.g., inputs that indicate the covariance of convolutional filters of the neural network). In this manner, the covariance matrix is used to define a multivariate probability distribution, and then the multivariate probability distribution is sampled to obtain initial filters. As one example, if a layer has 100 filters, the probability distribution is sampled 100 times and the sampled values are used as the initial values of the filters. In an example, the processor subsystem 110 as described above in FIG. 1 is configured to train the neural network using the covariance matrix E as an initialization input.

In some examples, convolutional layers of the neural network can be initialized using the covariance matrix $\Sigma$ and then frozen (i.e., fixed such that the parameters of the convolutional layers remain unchanged during training of the neural network).

At 460, a computer-controlled machine is operated using the neural network initialized at 456. For example, the computer-controlled machine may correspond to any of the systems or devices described below in FIGS. 5-11.

Figure 5:
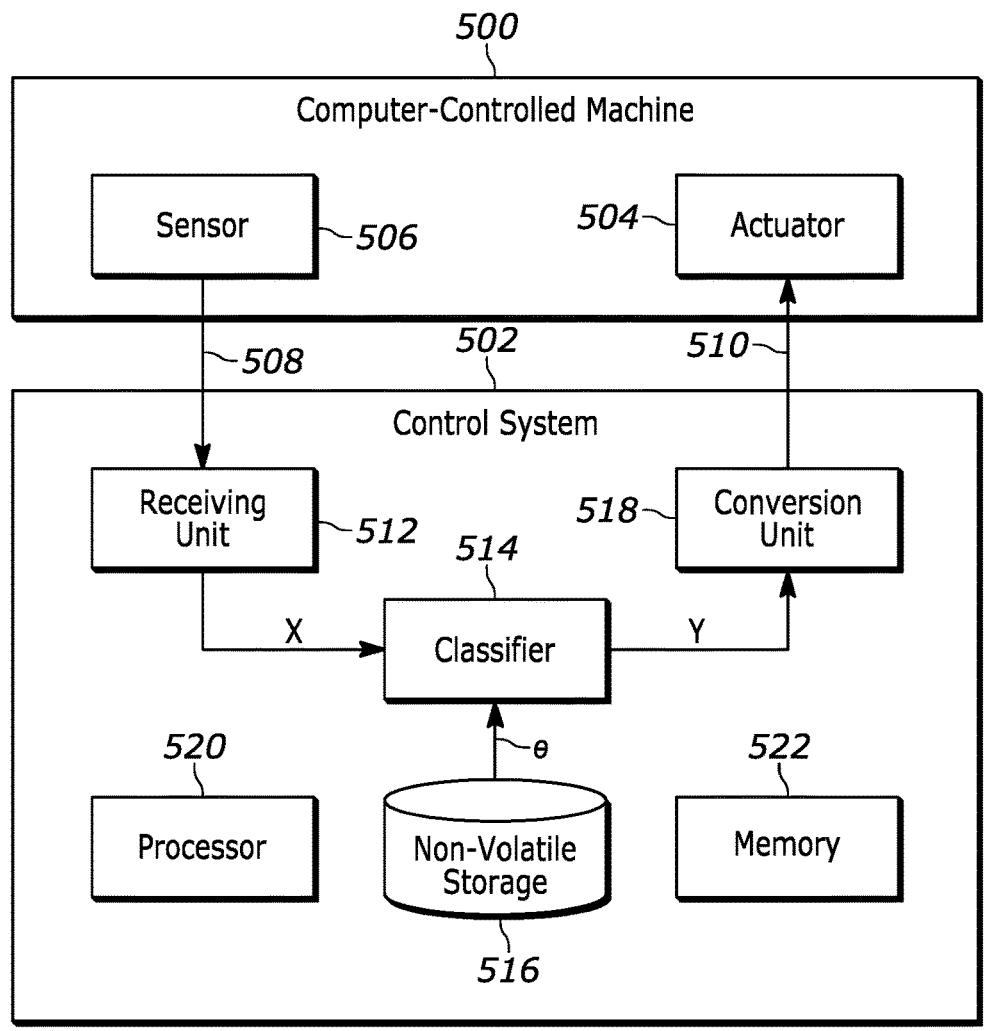
FIG. 5 depicts a schematic diagram of an interaction between a computer-controlled machine and a control system according to the principles of the present disclosure.

FIGS. 5-11 depict example systems and devices that may implement neural network initialization systems and methods according to the present disclosure. FIG. 5 depicts a schematic diagram of an interaction between a computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to produce each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network. For example, the classifier 514 corresponds to the classifier 408 described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more anomaly detection methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the anomaly detection methodologies as disclosed herein. Non-volatile storage 516 may also include data supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
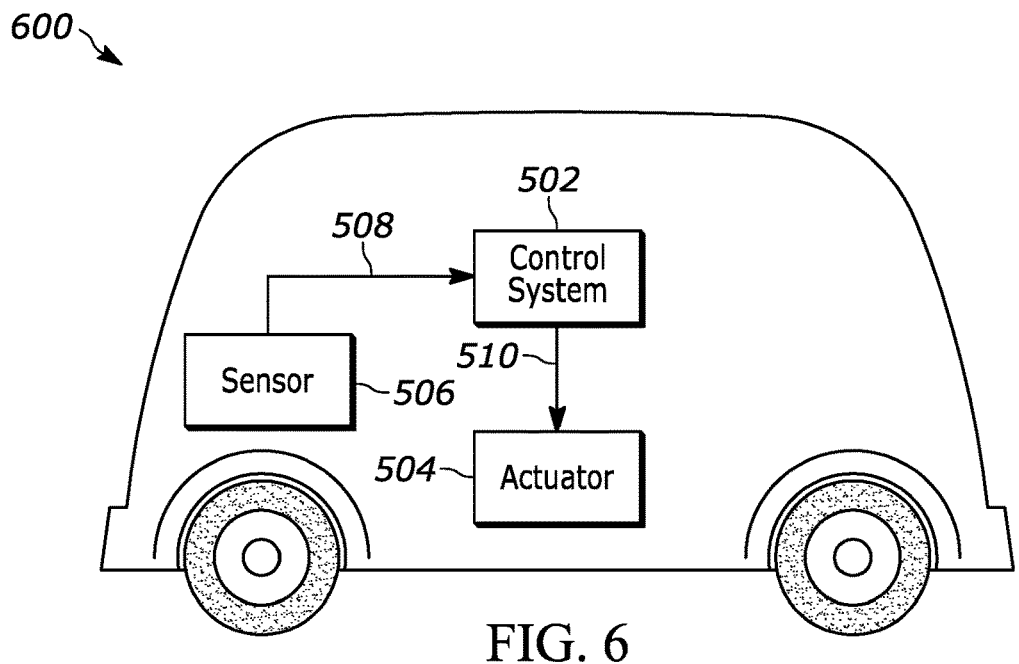
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
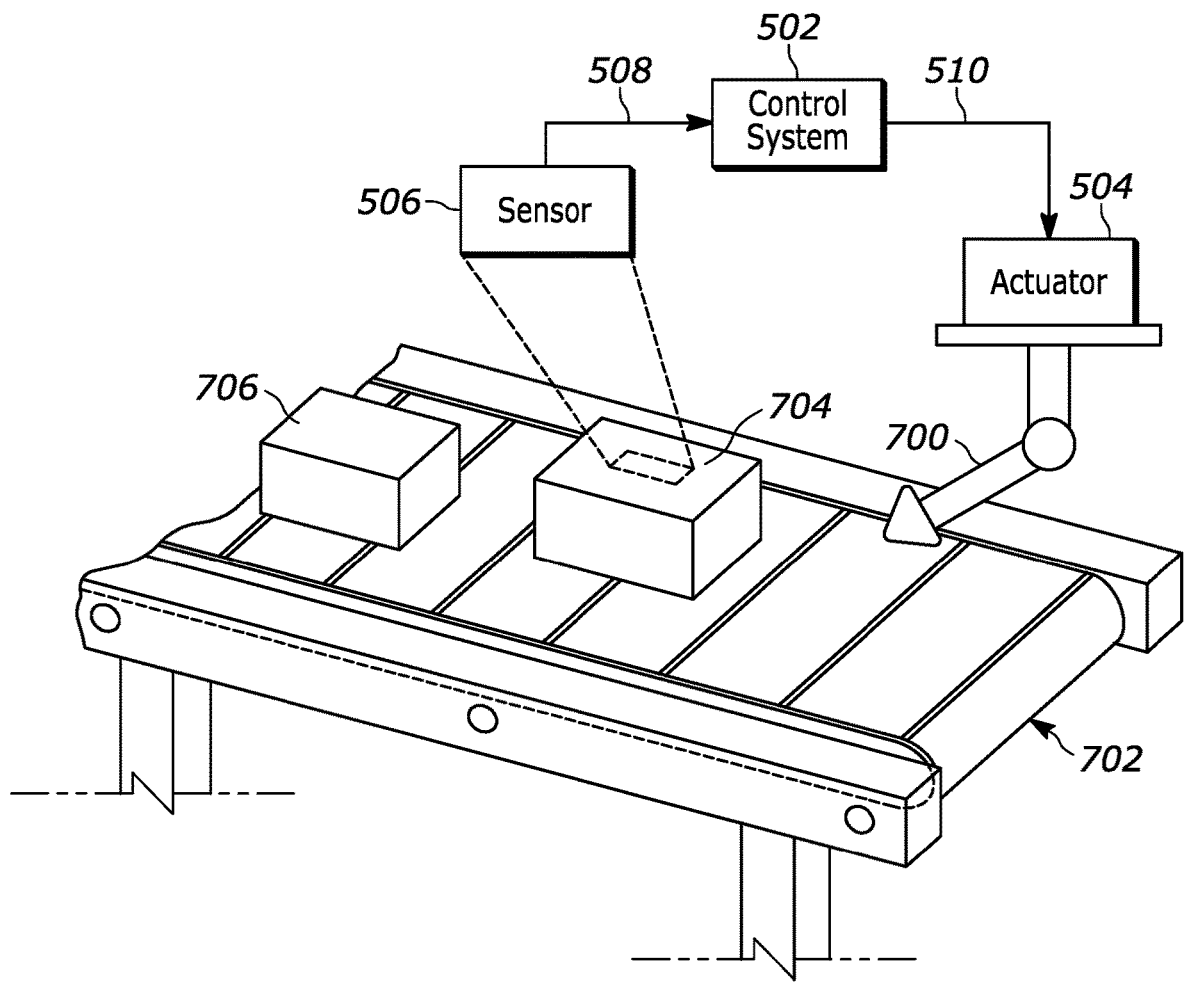
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
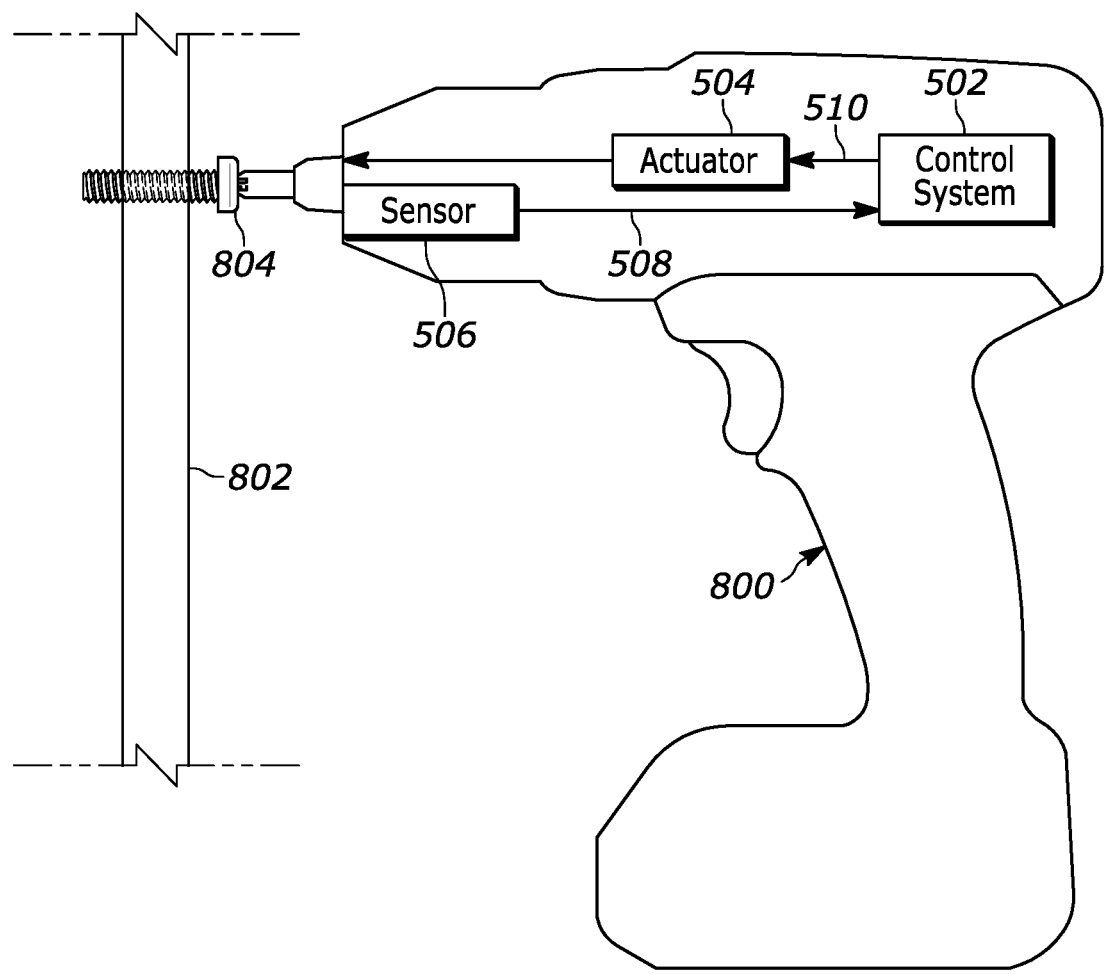
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
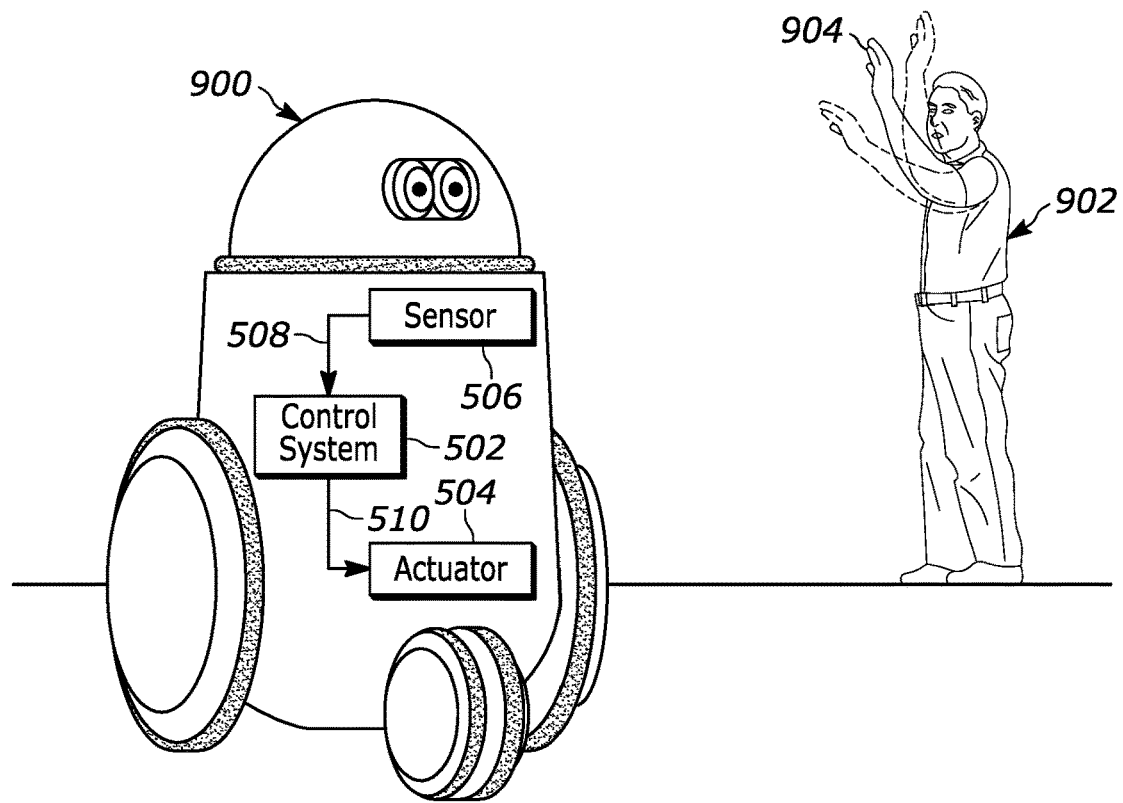
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
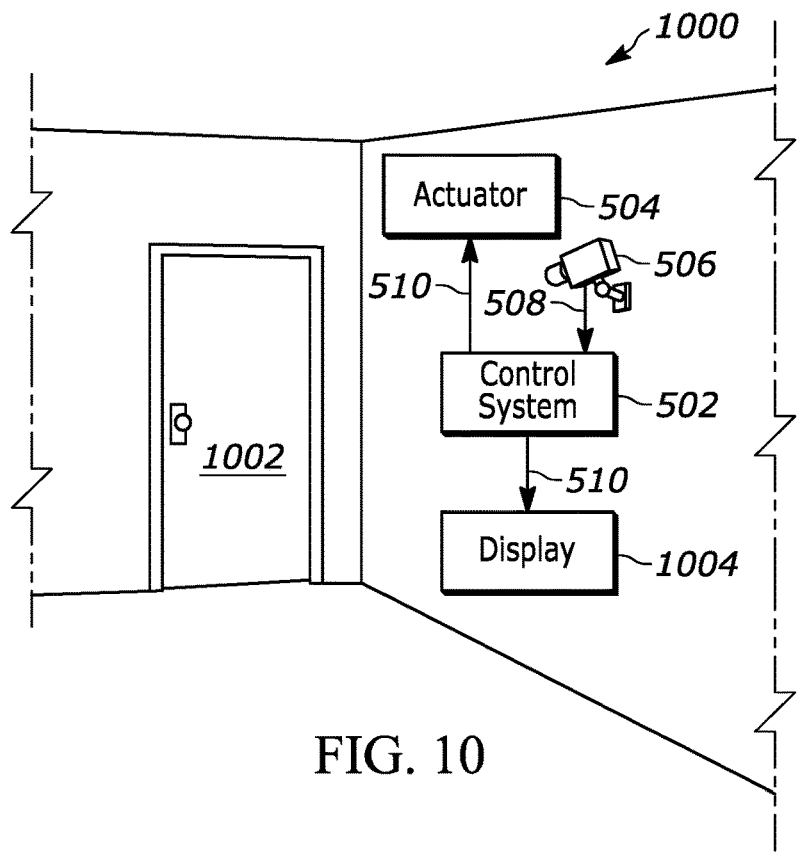
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
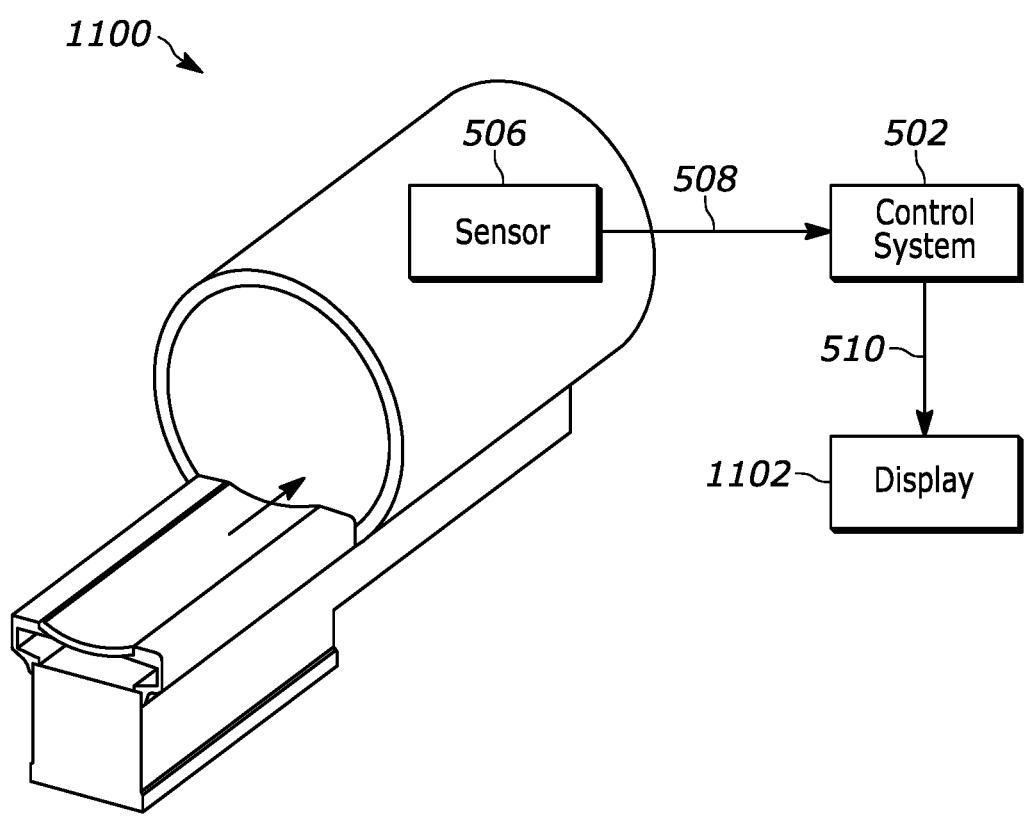
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of initializing and training a neural network having a plurality of layers, the method comprising:
    defining a first function configured to generate a filter based on a plurality of variance values associated with respective pairs of parameters of the plurality of layers;
    calculating the plurality of variance values based on depths of respective layers of the plurality of layers such that the variance values increase as the depths increase;
    calculating a covariance matrix using the first function, wherein the covariance matrix has a block structure and each block of the covariance matrix corresponds to a covariance between a respective parameter and other parameters of the plurality of layers;
    providing, as input, the covariance matrix to the neural network to initialize the neural network for training; and
    generating, using the neural network, an output based on the covariance matrix.

2. The method of claim 1, wherein the first function corresponds to a Gaussian function.

3. The method of claim 1, wherein the filter is a super-Gaussian filter.

4. The method of claim 1, wherein the covariance corresponds to a covariance between a filter pixel and other filter pixels.

5. The method of claim 1, wherein calculating the plurality of variance values includes calculating the plurality of variance values further based on a velocity that indicates a rate at which the variance values increase from an initial variance as the depths increase.

6. The method of claim 1, wherein calculating the plurality of variance values includes calculating the plurality of variance values further based on an acceleration parameter.

7. The method of claim 1, wherein calculating the plurality of variance values includes calculating the plurality of variances in accordance with $$\sigma \leftarrow \sigma_0 + v_\sigma d + \frac{1}{2}a_\sigma d^2,$$

wherein $\sigma$ is a calculated variance value, $\sigma_0$ is an initial variance, v is a velocity at which variance grows from the initial variance as a depth d increases, and $\alpha$ is an acceleration parameter.

8. The method of claim 1, wherein the covariance matrix is used to define a multivariate probability distribution, and wherein initializing the neural network includes sampling the multivariate probability distribution to obtain initial filters for the neural network.

9. A computing device configured to initialize and train a neural network having a plurality of layers, the computing device including a processing device configured to execute instructions stored in memory to:
    define a first function configured to generate a filter based on a plurality of variance values associated with respective pairs of parameters of the plurality of layers;
    calculate the plurality of variance values based on depths of respective layers of the plurality of layers such that the variance values increase as the depths increase;

calculate a covariance matrix using the first function, wherein the covariance matrix has a block structure and each block of the covariance matrix corresponds to a covariance between a respective parameter and other parameters of the plurality of layers;

provide, as input, the covariance matrix to the neural network to initialize the neural network for training; and generate, using the neural network, an output based on the covariance matrix.

10. The computing device of claim 9, wherein the first function corresponds to a Gaussian function.

11. The computing device of claim 9, wherein the filter is a super-Gaussian filter.

12. The computing device of claim 9, wherein the covariance corresponds to a covariance between a filter pixel and other filter pixels.

13. The computing device of claim 9, wherein, to calculate the plurality of variance values, the processing device is configured to execute instructions to calculate the plurality of variance values further based on a velocity that indicates a rate at which the variance values increase from an initial variance as the depths increase.

14. The computing device of claim 9, wherein, to calculate the plurality of variance values, the processing device is configured to execute instructions to calculate the plurality of variance values further based on an acceleration parameter.

15. The computing device of claim 9, wherein, to calculate the plurality of variance values, the processing device is configured to execute instructions to calculate the plurality of variances in accordance with $$\sigma \leftarrow \sigma_0 + v_\sigma d + \frac{1}{2}a_\sigma d^2,$$

wherein $\sigma$ is a calculated variance value, $\sigma_0$ is an initial variance, v is a velocity at which variance grows from the initial variance as a depth d increases, and $\alpha$ is an acceleration parameter.

16. The computing device of claim 9, wherein the processing device is configured to execute instructions to use the covariance matrix to define a multivariate probability distribution, and wherein initializing the neural network includes sampling the multivariate probability distribution to obtain initial filters for the neural network.

17. A computer-controlled machine comprising the computing device of claim 9, wherein the computer-controlled machine further comprises an actuator configured to control an operation of the computer-controlled machine based on an output of the neural network.

18. A system configured to train a neural network having a plurality of layers, the system comprising:

data storage that stores training data for training the neural network;

memory that stores a data representation of the neural network; and a processing device configured to iteratively train the neural network using the training data to obtain a trained neural network, wherein iteratively training the neural network includes initializing the neural network by defining a first function configured to generate a filter based on a plurality of variance values associated with respective pairs of parameters of the plurality of layers, calculating the plurality of variance values based on depths of respective layers of the plurality of layers such that the variance values increase as the depths increase, calculating a covariance matrix using the first function, wherein the covariance matrix has a block structure and each block of the covariance matrix corresponds to a covariance between a respective parameter and other parameters of the plurality of layers, and providing, as input, the covariance matrix to the neural network to initialize the neural network for training by the processing device.

19. The system of claim 16, wherein calculating the plurality of variance values includes calculating the plurality of variance values further based on a velocity that indicates a rate at which the variance values increase from an initial variance as the depths increase.

20. The system of claim 16, wherein calculating the plurality of variance values includes calculating the plurality of variances in accordance with $$\sigma \leftarrow \sigma_0 + v_\sigma d + \frac{1}{2}a_\sigma d^2,$$

wherein $\sigma$ is a calculated variance value, $\sigma_0$ is an initial variance, v is a velocity at which variance grows from the initial variance as a depth d increases, and $\alpha$ is an acceleration parameter.

* * * * *